United States Patent [19]
Herzl

[11] 3,733,897
[45] May 22, 1973

[54] SENSOR ASSEMBLY FOR VORTEX-TYPE FLOWMETERS
[75] Inventor: Peter J. Herzl, Morrisville, Pa.
[73] Assignee: Fischer & Porter Co., Warminster, Pa.
[22] Filed: Oct. 14, 1971
[21] Appl. No.: 189,232

[52] U.S. Cl. ............... 73/194 B, 73/204, 73/362 SC
[51] Int. Cl. ............................................. G01f 1/00
[58] Field of Search ..................... 73/194, 204, 362; 307/310

[56] References Cited
UNITED STATES PATENTS

| 3,279,251 | 10/1966 | Chanaud | 73/204 X |
| 2,996,918 | 8/1961 | Hunter | 307/310 X |
| 3,219,843 | 11/1965 | Follett | 307/310 |
| 3,552,210 | 1/1971 | Wright, Jr. | 73/362 X |
| 3,587,312 | 6/1971 | McMurtrie et al. | 73/194 X |
| 3,535,927 | 10/1970 | Mahon et al. | 73/194 |
| 2,871,376 | 1/1959 | Kretzmer | 307/310 |

Primary Examiner—Herbert Goldstein
Attorney—Michael Ebert et al.

[57] ABSTRACT

A sensor assembly for swirl, vortex and other types of hydrodynamic metering devices in which fluidic variations are sensed to afford an indication of flow rate or other fluidic values. The assembly is constituted by a heated transistor chip which is exposed to the fluid being sensed and is cooled thereby, the transistor being connected to an external circuit to define a direct-current amplifier whose base current is substantially constant, but whose collector current varies as a function of the heat extracted from the transistor by the fluid, thereby producing a corresponding output signal.

5 Claims, 3 Drawing Figures

PATENTED MAY 22 1973 3,733,897
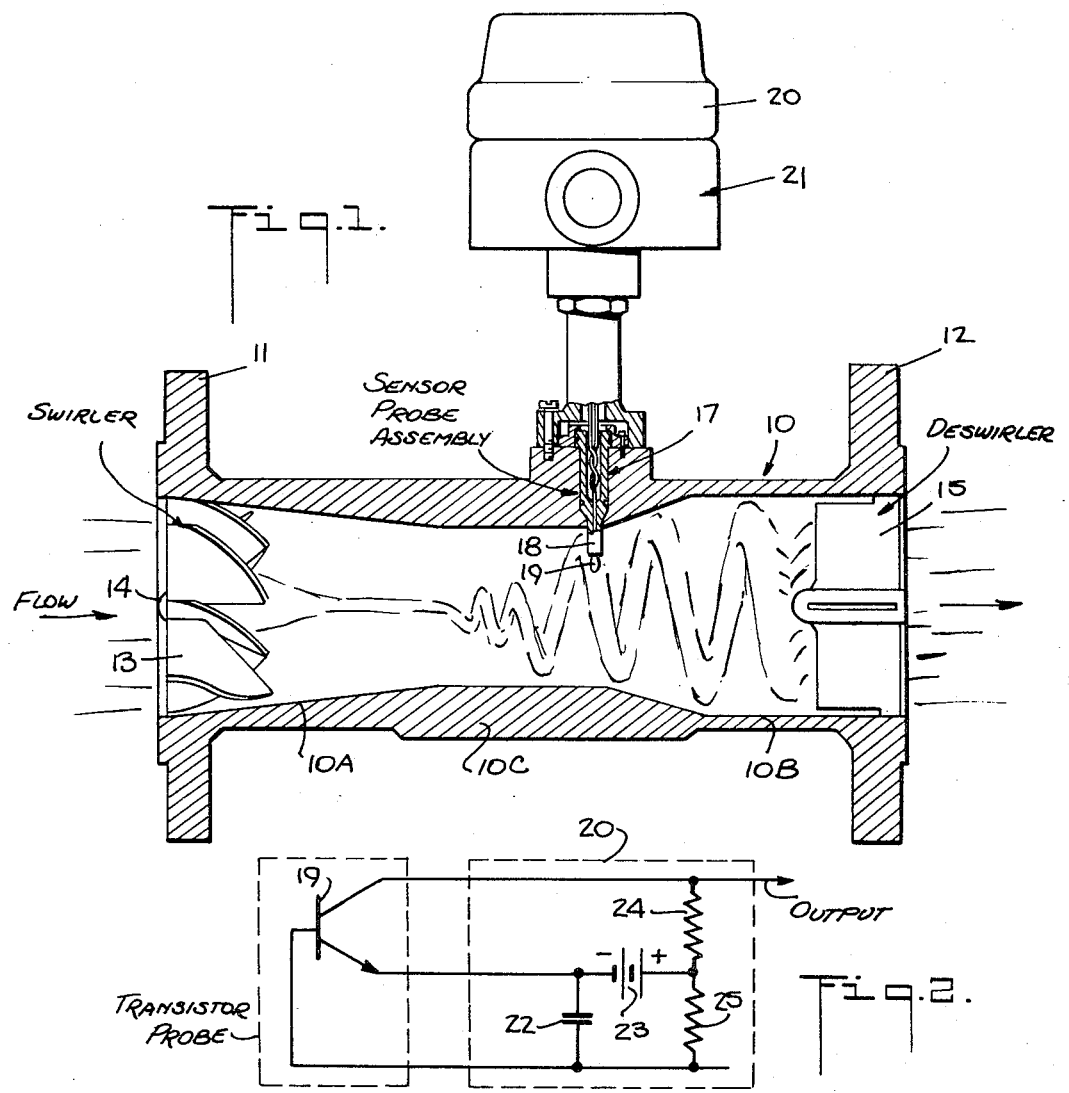
Fig.1.
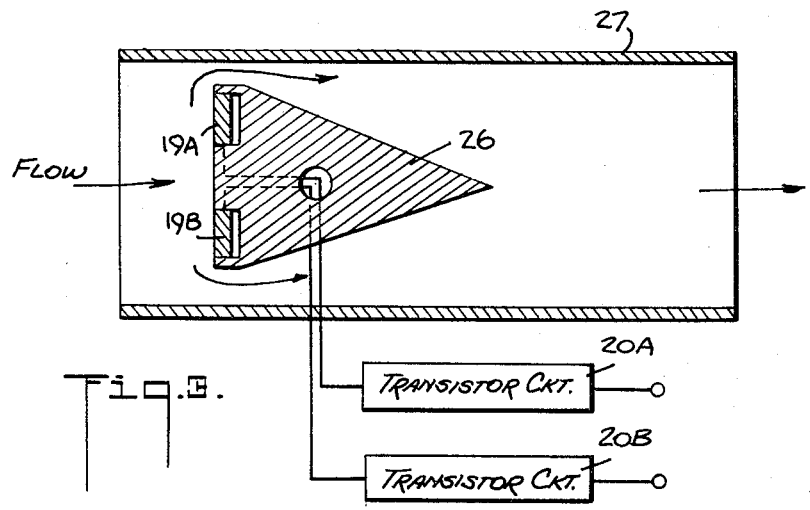
Fig.2.
Fig.3.

SENSOR ASSEMBLY FOR VORTEX-TYPE FLOWMETERS

BACKGROUND OF THE INVENTION

This invention relates generally to vortex-type flowmeters, and more particularly to an improved sensor assembly for such meters.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body type. The present invention is not limited to these specific types and is applicable to all forms of hydrodynamic oscillatory metering devices in which fluidic variations are sensed to provide an indication.

In Swirlmeters, such as those described in U.S. Pat. Nos. 3,279,251, 3,314,289 and Re. 26,410, among others, a homogeneous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube, is a Venturi section which first constricts and then expands the flow passage to transform the swirling motion into precessional movement in the expanding region of the Venturi section to create a vortex.

Precession takes place about the central axis of the flow tube at a discrete frequency that is a function of the volumetric flow rate. De-swirl blades in the outlet section of the flow tube serve to straighten out the fluid leaving the meter. Cyclic variations in local fluid velocity occurring by reason of precession, are detected to provide electrical pulses whose frequency is measured to provide an indication of flow rate.

In commercially available Swirlmeters, detection of the cyclic variations is effected by means of a sensor probe mounted in the body of the meter transversely with respect to the longitudinal axis of the meter in the area where the vortex precession is near the inner wall of the flow tube. At the tip of the sensor probe is a heated thermistor which serves to detect the frequency of precession. A thermistor is a solid-state device made of a semi-conducting oxidic material that exhibits a high negative temperature coefficient of resistivity whereby the resistance of the device increases rapidly with decreasing temperature.

In the Swirlmeter, the thermistor is caused to operate in its self-heat region by applying a constant current thereto to heat the thermistor to a temperature above that of the fluid flowing through the meter. For a given fluid velocity, the thermistor is caused by the fluid passing thereby to undergo an appreciable increase in resistance by means of the cooling effect produced by the fluid stream.

Inasmuch as the current applied to the thermistor is maintained constant, an increase in its resistance will be effective as an increase in voltage. Any increase in velocity such as that produced by a fluidic vortex will further cool the thermistor, giving rise to a further increase in voltage. The voltage variations developed in the thermistor circuit as a result of the cyclic variations in local fluid velocity, have a frequency depending on flow rate and constitute the output signal.

In the bluff-body type of vortex meter, such as that described in U.S. Pat. Nos. 3,116,639 and 3,587,312, the body is mounted within the flow conduit transversely with respect to the flow axis thereof to create fluidic oscillations whose frequency is proportional to flow rate. In U.S. Pat. No. 3,587,312, these fluidic oscillations are detected by a pair of heated thermistors operating in a manner similar to that disclosed above in connection with the Swirlmeter. Other types of bluff-body flowmeters are disclosed in U.S. Pat. Nos. 3,116,639 and 3,587,312. The invention is also applicable to vortex-type meters in which the obstacle in the conduit is positioned along the flow axis.

Existing thermistor sensors for vortex-type meters have several disadvantages, among which are fragility, poor frequency response and relatively large power requirements, as well as high cost and limited commercial availability.

SUMMARY OF THE INVENTION

In view of the foregoing, it is the main object of the invention to provide a heated transistor sensor assembly for detecting fluidic variations in a vortex or hydrodynamic oscillatory metering device to produce a corresponding output signal.

Among the significant advantages of a heated transistor sensor in accordance with the invention, are:

1. It is capable of heating itself with a minimal use of power.
2. It has a relatively small thermal mass and a large surface area with respect to its mass, whereby the transistor responds more quickly to changes in flow than a thermistor.
3. It yields a relatively large output for small changes in temperature, and therefore has a good signal-to-noise ratio.
4. It is less expensive than other forms of sensors.

The present invention makes use of a standard, low-cost transistor chip as a fluidic sensor, the transistor being included in an amplifier circuit whose output reflect variations in the fluid to which the transistor is exposed. Since such transistors are produced by many semiconductor manufacturers and are available in production quantities, this factor is a distinct practical advantage, for thermistors of the type heretofore used as sensors are a more specialized component and not as readily available.

Briefly stated, these objects are accomplished by means of a sensor assembly in which fluidic variations in a flowmeter conduit are sensed by a heated transistor chip exposed to the fluid and cooled thereby, the transistor being connected to an external circuit to define a direct-current amplifier whose base current is substantially constant but whose collector current varies as a function of the heat extracted from the transistor by the fluid, to produce a corresponding output signal.

OUTLINE OF THE DRAWING

For a better understanding of the invention as well as other objects and further features thereof, reference is made to the following detailed description to be read in conjunction with the accompanying drawing, wherein:

FIG. 1 is a longitudinal section taken through a swirl-type meter incorporating a transistor probe assembly in accordance with the invention;

FIG. 2 schematically shows the circuit diagram of the assembly; and

FIG. 3 is a sectional view of a bluff body flowmeter including a pair of transistor assemblies in accordance with the invention.

DESCRIPTION OF THE INVENTION

Referring now to FIGS. 1 and 2, a Swirlmeter which includes a transistor assembly in accordance with the invention, comprises a meter body constituted by a flow conduit or tube 10 having mounting flanges 11 and 12 at either end thereof to facilitate the interposition of the meter in a line whose fluid is to be metered. The fluid may be any homogeneous fluid or gas.

Flow tube 10 is constituted by a cylindrical inlet section 10A, a cylindrical outlet section 10B, and a Venturi section 10C interconnecting the inlet and outlet sections. Venturi section 10C is formed with a throat entrance region of decreasing cross-sectional area extending downstream from inlet section 10A to a constricted or throat region which leads to a flaring or throat exit region of increasing cross-sectional area communicating with outlet section 10B. Thus the Venturi serves to constrict the flow coming from the inlet section and to expand flow in advance of the outlet section.

Mounted within inlet section 10A is a fixed array of curved swirl blades 13 radiating from a hub 14. To provide a strong signal and a high information rate, the curvature of the swirl blades is made such as to significantly deflect the incoming flow of fluid with respect to the longitudinal axis of flow tube 10.

Thus fluid entering inlet section 10A is forced by the array of swirl blades to assume a swirling motion, the swirling fluid being directed into Venturi section 10C. In the flaring exit region of the Venturi where the increasing area gives rise to fluid expansion, the swirling flow is converted into precessional motion about the longitudinal axis of the tube. The frequency of precession depends on the volumetric flow rate. To straighten out the flow leaving the meter, a set of planar de-swirl blades 15 extending radially from a hub 16, is fixedly disposed in the outlet section 10B.

Cyclic variations in local fluid velocity, as a result of the processional motion, are detected by a sensor assembly generally indicated by numeral 17 and constituted by a probe 18 which extends into Venturi section 10C at right angles to the longitudinal axis thereof and terminates in a transistor 19 whose collector current is varied periodically in response to temperature changes in the transistor produced by the processing fluid. In practice, the transistor may be mounted on a plug receivable in a socket mounted on the probe, to facilitate replacement thereof, when necessary.

Transistor 19, as shown in FIG. 2, is arranged to operate in conjunction with a resistance-capacitance network and a D-C source, to function as a straight-forward D-C amplifier. The associated electronic circuit is generally designated by numeral 20, and is contained in a casing 21 mounted on the meter body, which may also include auxiliary amplifiers and signal processing circuits.

In the D-C amplifier, the base of transistor 19 is connected through capacitor 22 to the negative pole of a D-C voltage supply 23 whose positive pole is connected through resistance 24 to the collector. The base of transistor 19 is also connected through resistor 25 to the positive pole of D-C supply 23. The output signal is taken from the collector.

With the transistor so connected as a simple D-C amplifier and with a voltage applied to the electrodes as shown, the collector current is equal to the base current multiplied by the D-C gain of the transistor. Thus:

$$I_c = I_b \times h_{fe}$$

where:

$I_c$ is the collector current
$I_b$ is the base current; and
$h_{fe}$ is the D-C gain.

The degree to which the transistor is heated is determined by the voltage applied thereto and the intensity of the collector current.

Power Dissipation = Ex I.

If, therefore, in the amplifier circuit shown in FIG. 2, the base current $I_b$ is constant and heat is extracted from the transistor as a result of a change in the movement of the fluid to which the transistor is exposed, this gives rise to a change in D-C gain $h_{fe}$ and in the collector current $I_c$. This change in collector current which flows through resistor 24, produces a voltage drop thereacross, and provides the output signal. The voltage variations developed in the transistor circuit as a result of cyclic variations in local fluid velocity, have a frequency depending on flow rate and constitute an output signal representative of flow rate.

In practice, a low-cost transistor having a small thermal mass and a large amount of surface area in relation to its mass, may be provided by a tiny transistor chip, such as a "2N 2222" silicon transistor whose approximate dimensions are: 0.020 by 0.020 inches square, and 0.006 inches thick. This transistor chip satisfies the low dissipation, gain, and fast response requirements of the system.

The invention is not, however, limited to transistors of the 2 N 2222 type, and larger or smaller transistors may be used. In practice, the transistor chip may be protectively coated or encased by a non-conductive sheath having good thermal conductivity.

In the bluff-body flowmeter shown in FIG. 3, the meter is constituted by a bluff body 26 mounted across a flow tube 27 at right angles to the flow axis, the body having a triangular cross-section whose flat base faces the incoming fluid. The incoming fluid is intercepted by the body.

Mounted flush with the base of the bluff body 26 are two transistor chips 19A and 19B of the type disclosed in connection with FIGS. 1 and 2, the transistors being associated with external transistor amplifier circuits 20A and 20B defining D-C amplifiers. A differential output is obtained at the collector outputs of circuit 20A and 20B.

The pair of transistor sensors operate in a differential manner in order to increase the amplitude of the oscillatory signal, while concurrently decreasing the amplitude of in-phase unwanted signals due to flow turbulence and sound waves that may be present in the flow tube, thereby providing an output with a high signal-to-noise ratio.

While there have been shown and described preferred embodiments of sensors for vortex-type flowmeter in accordance with the invention, it will be appreciated that many changes and modifications may be made therein without, however, departing from the essential spirit of the invention.

I claim:

1. In combination with a vortex-type meter having a flow conduit in which a fluid to be measured is caused to produce fluidic variations at a frequency which is a function of flow rate; a sensor assembly for detecting said fluidic variations to produce an electrical signal at the same frequency, said assembly comprising:
   A. a transistor mounted in said conduit and exposed to said fluidic variations, said transistor having base, collector and emitter electrodes, said transistor having a small thermal mass and a large amount of surface area in relation to its mass whereby said transistor has a fast response time,
   B. an external electronic circuit connected to the electrodes of said transistor to define therewith a D-C amplifier maintaining said transistor in a heated condition, said transistor being cooled by said fluidic variations, the base current of said amplifier being substantially constant and the collector current thereof varying as a function of the heat extracted from said transistor, and
   C. means coupled to said collector to derive an output signal therefrom.

2. An assembly as set forth in claim 1, wherein said vortex meter is of the swirl type and includes swirl blades.

3. An assembly as set forth in claim 1, wherein said vortex meter is of the bluff-body type.

4. An assembly as set forth in claim 1, wherein said transistor is sheathed in a protective layer having good thermal conductivity.

5. A sensor assembly as set forth in claim 1 further including a capacitor connected between the emitter and base of the transistor.

* * * * *